(12) United States Patent
Goeddel et al.

(10) Patent No.: US 6,665,356 B1
(45) Date of Patent: Dec. 16, 2003

(54) SAMPLE TIMING CONTROL FOR DEMODULATION OF PHASE-MODULATED SIGNALS

(75) Inventors: Thomas W. Goeddel, Fair Haven, NJ (US); Alex Matusevich, Morris Plains, NJ (US); Mohsen Sarraf, Rumson, NJ (US); Jonathan M. Tobias, Florham Park, NJ (US); Sheng-Jen Tsai, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/329,399

(22) Filed: Jun. 10, 1999

(51) Int. Cl.$^7$ ............................. H04L 27/22; H04L 7/00
(52) U.S. Cl. ..................... 375/329; 375/340; 375/355
(58) Field of Search ...................... 375/329, 322, 375/355, 340; 329/304

(56) References Cited

U.S. PATENT DOCUMENTS

| | | | | |
|---|---|---|---|---|
| 3,919,651 A | * | 11/1975 | Le Mouel | 329/304 |
| 4,860,318 A | * | 8/1989 | Shaw et al. | 375/328 |
| 5,440,268 A | * | 8/1995 | Taga et al. | 329/308 |
| 5,625,652 A | * | 4/1997 | Petranovich | 375/355 |
| 5,864,588 A | * | 1/1999 | Miyamoto | 375/326 |

FOREIGN PATENT DOCUMENTS

| | | | | |
|---|---|---|---|---|
| JP | | 04281647 A | * 10/1992 | H04L/27/14 |

* cited by examiner

*Primary Examiner*—Stephen Chin
*Assistant Examiner*—David B. Lugo
(74) *Attorney, Agent, or Firm*—Ryan, Mason & Lewis, LLP

(57) ABSTRACT

A phase-modulated signal such as a quadrature phase-shift-keyed (QPSK) signal in a wireless communication system is demodulated using sample timing based at least in part on frequency information generated by frequency demodulating the phase-modulated signal. The phase-modulated signal is separated into first and second portions, the first portion is phase demodulated to generate demodulated symbols, and the second portion is frequency demodulated to generate, e.g., a measure of the instantaneous frequency of the phase-modulated signal. The instantaneous frequency measure is processed to identify one or more symbol transitions, and the identified transitions are used to establish the sample timing such that proper sampling of the symbols is ensured.

22 Claims, 5 Drawing Sheets

FIG. 7

| SYNC WORD | S0 | S1 | S2 | S3 | S4 | S5 | S6 | S7 | S8 | S9 | S10 | S11 | S12 | S13 |
|---|---|---|---|---|---|---|---|---|---|---|---|---|---|---|
| SYNC 1 | $-\pi/4$ | $-\pi/4$ | $-\pi/4$ | $3\pi/4$ | $\pi/4$ | $3\pi/4$ | $-3\pi/4$ | $3\pi/4$ | $-3\pi/4$ | $-\pi/4$ | $3\pi/4$ | $\pi/4$ | $-\pi/4$ | $-\pi/4$ |
| SYNC 2 | $-\pi/4$ | $-\pi/4$ | $-\pi/4$ | $3\pi/4$ | $3\pi/4$ | $3\pi/4$ | $\pi/4$ | $3\pi/4$ | $\pi/4$ | $-\pi/4$ | $3\pi/4$ | $3\pi/4$ | $-\pi/4$ | $-\pi/4$ |
| SYNC 3 | $-3\pi/4$ | $\pi/4$ | $3\pi/4$ | $3\pi/4$ | $-3\pi/4$ | $\pi/4$ | $\pi/4$ | $3\pi/4$ | $-3\pi/4$ | $-\pi/4$ | $\pi/4$ | $\pi/4$ | $-3\pi/4$ | $-\pi/4$ |
| SYNC 4 | $\pi/4$ | $-3\pi/4$ | $3\pi/4$ | $\pi/4$ | $\pi/4$ | $\pi/4$ | $-3\pi/4$ | $\pi/4$ | $\pi/4$ | $3\pi/4$ | $-3\pi/4$ | $3\pi/4$ | $\pi/4$ | $-3\pi/4$ |
| SYNC 5 | $\pi/4$ | $-3\pi/4$ | $-\pi/4$ | $-3\pi/4$ | $-3\pi/4$ | $-\pi/4$ | $\pi/4$ | $\pi/4$ | $-3\pi/4$ | $-3\pi/4$ | $-3\pi/4$ | $-3\pi/4$ | $\pi/4$ | $-3\pi/4$ |
| SYNC 6 | $-3\pi/4$ | $-3\pi/4$ | $\pi/4$ | $\pi/4$ | $\pi/4$ | $-\pi/4$ | $-3\pi/4$ | $\pi/4$ | $-3\pi/4$ | $\pi/4$ | $\pi/4$ | $-3\pi/4$ | $-3\pi/4$ | $-3\pi/4$ |

SAMPLE TIMING CONTROL FOR DEMODULATION OF PHASE-MODULATED SIGNALS

FIELD OF THE INVENTION

The present invention relates generally to communication systems, and more particularly to communication systems such as wireless time division multiple access (TDMA) systems which utilize differential quadrature phase-shift-keyed (DQPSK) modulation or other types of phase modulation.

BACKGROUND OF THE INVENTION

A phase modulation technique known as π/4 DQPSK is utilized to transmit digital data in certain types of communication systems, such as wireless TDMA systems. In accordance with this technique, data is transmitted by changing the phase of a modulated signal. Each phase shift, over a specific period of time, is referred to as a symbol. The technique achieves an increase in spectral efficiency by multiplexing two signals in phase quadrature. The two signals, an in-phase (I) signal and a quadrature (Q) signal 90° out of phase with the I signal, are modulated onto a carrier signal to form a QPSK signal suitable for transmission. In the case of π/4 DQPSK, the four possible phase shifts are ±π/4 (±/45°) and ±3π/4 (±135°), and a typical symbol period T in a conventional IS-136 or IS-54 wireless TDMA system is 41.2 μs.

A conventional π/4 DQPSK demodulator suppresses the carrier signal and recovers the I and Q signals. The I and Q signals are sampled at intervals of T/4 and digitized using an analog-to-digital (A/D) converter. The digitized samples are then processed in a digital signal processor (DSP) to recover the phase of the symbol and its signal strength. FIG. 1 illustrates the T/4 sampling process for a given I or Q signal. The I or Q signal includes a stream of symbols, denoted N−1, N, N+1, N+2, etc. in this example. Each of the symbols of the I or Q signal is sampled at intervals of T/4, as shown.

In general, between a base station and a mobile unit in a wireless TDMA system, the T/4 sampling of symbols in a DQPSK demodulator is generally asynchronous with respect to the transmitted symbol. The best case situation, illustrated in FIG. 2, is when the four T/4 samples for a given symbol are taken during the most stable portion of the current symbol, i.e., symbol N. The worst case, illustrated in FIG. 3, occurs when one of the T/4 samples is taken at the transition between the current symbol N and a previous symbol N−1 or a subsequent symbol N+1. When taking samples asynchronously, one can guard against the worst case by comparing the quality of an odd sample pair, i.e., samples 1 and 3 in FIG. 3, with that of an even sample pair, i.e., samples 2 and 4 in FIG. 3, in every set of four T/4 samples, and keeping only the best pair for each symbol. This approach ensures that there will be at least two acceptable samples per symbol of the four T/4 samples taken in the symbol interval, thereby guaranteeing an effective T/2 sampling quality. Although a similar approach could be used with a higher T/8 sampling rate in order to ensure an effective T/4 sampling quality, a more powerful A/D converter and DSP will generally be required, thereby increasing the complexity and cost of the demodulator.

A need therefore exists for a phase demodulation technique which can better synchronize the sampling process to the received symbols, such that improved performance can be obtained relative to the above-described conventional techniques, without significantly increasing the complexity and cost associated with the demodulation process.

SUMMARY OF THE INVENTION

The invention provides improved phase demodulation techniques for use with quadrature phase-shift-keyed (QPSK) signals and other types of phase-modulated signals in a communication system. These phase demodulation techniques utilize sample timing which is based at least in part on frequency information generated by frequency demodulating the phase-modulated signal. In an illustrative embodiment of the invention, a phase-modulated signal is separated into first and second portions. The first portion is then phase demodulated to generate demodulated symbols, while the second portion is frequency demodulated to generate a measure of the instantaneous frequency of the phase-modulated signal. The instantaneous frequency measure is then processed to identify one or more symbol transitions, and the identified transitions are used to establish the sample timing such that proper sampling of the symbols is ensured. For example, the measure of the instantaneous frequency of the phase-modulated signal may be a signal having a signature associated with a particular synchronization word utilized in the system, and may be processed to generate information which is used in a digital signal processor (DSP) or other suitable processing circuitry to generate, adjust or otherwise control a sample clock used in sampling the demodulated symbols.

By ensuring proper symbol timing in the demodulation process, the invention provides significantly improved bit error rate (BER) performance for the received data. For example, in a system utilizing π/4 DQPSK modulation, the invention can ensure a desired T/4 symbol sampling without any increase in the sampling rate or the complexity and cost of the demodulator. Although the invention is particularly well suited for use in applications such as wireless TDMA systems, it can provide similar advantages in numerous other communication system applications.

BRIEF DESCRIPTION OF THE DRAWINGS

FIG. 7 is a table showing a set of synchronization words which may be utilized to provide sample timing in the receiver of FIG. 4 for an exemplary TDMA system, in accordance with the invention.

DETAILED DESCRIPTION OF THE INVENTION

The present invention will be illustrated below in conjunction with exemplary quadrature phase-shift-keyed (QPSK) demodulation techniques. It should be understood, however, that the invention is not limited to use with any particular type of communication system, but is instead more generally applicable to any system in which it is desirable to provide improved phase demodulation performance without unduly increasing system complexity. For example, it will be apparent to those skilled in the art that the invention can be applied to demodulation of a wide variety of other types of phase-modulated signals.

Figure 1:
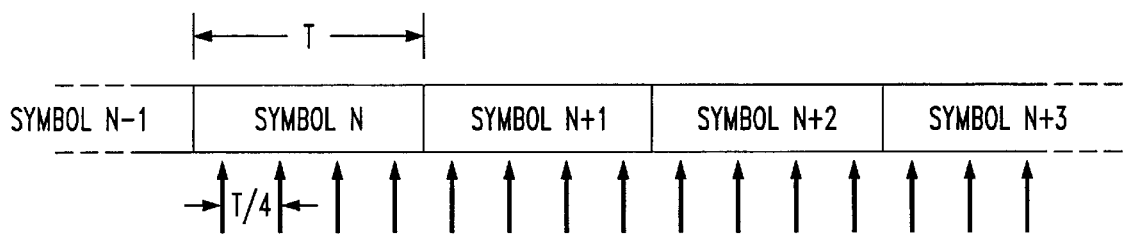
FIGS. 1, 2 and 3 illustrate sampling of symbols in accordance with a conventional π/4 DQPSK demodulation technique.
Figure 3:
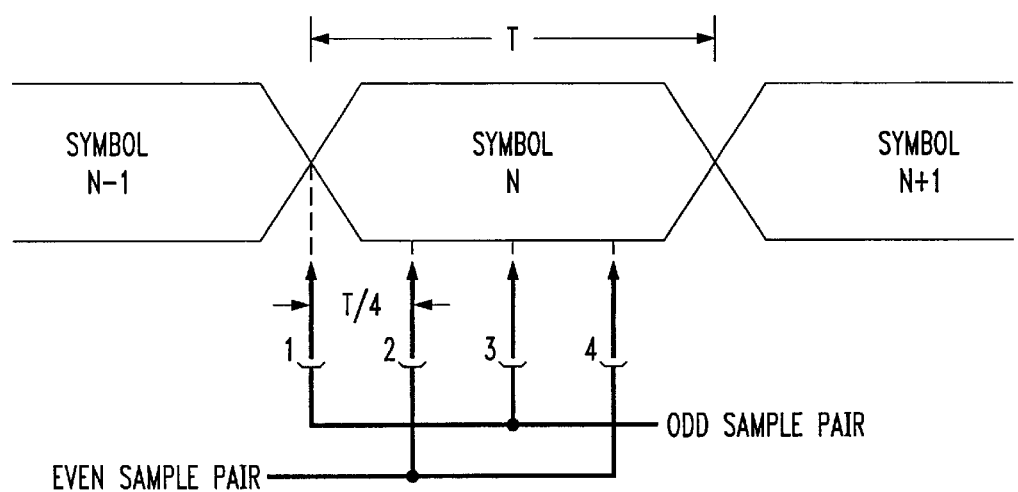
Figure 4:
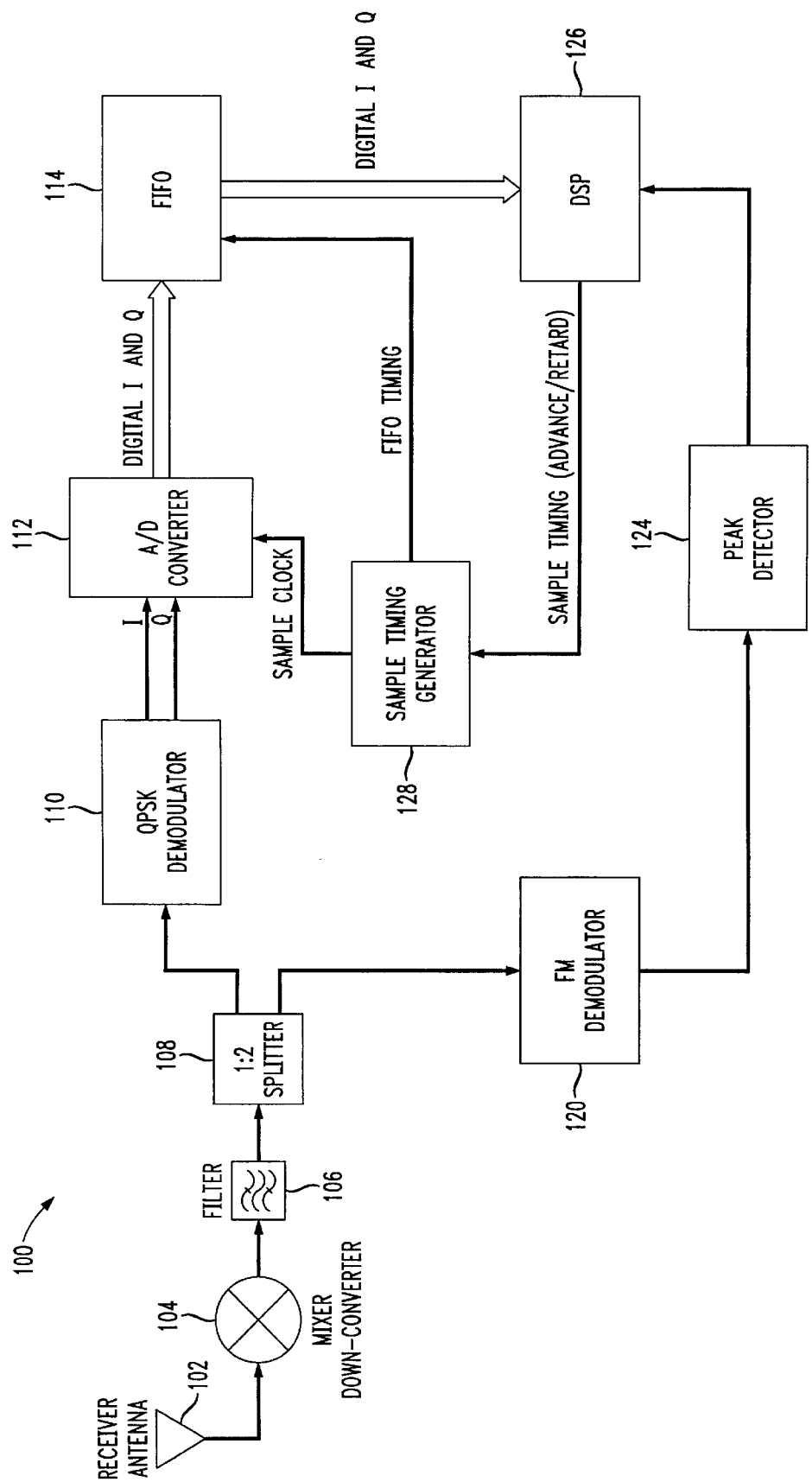
FIG. 4 is a block diagram of a receiver in accordance with an illustrative embodiment of the invention.

FIG. 4 shows a block diagram of a QPSK receiver 100 in accordance with an illustrative embodiment of the invention. The QPSK receiver 100 may be used to demodulate, e.g., π/4 DQPSK signal such as that described in conjunction with FIGS. 1 through 3, or another type of QPSK signal. A QPSK-modulated carrier signal received via a receiver antenna 102 is down-converted in a mixer/down-converter 104, and band-pass filtered in a filter 106 to recover the QPSK signal. The QPSK signal is then split into two separate half-power portions in a 1:2 splitter 108. The first portion of the QPSK signal is applied to a conventional QPSK demodulator 110. The in-phase (I) and quadrature (Q) signals generated by the QPSK demodulator 110 are applied to an analog/digital (A/D) converter 112 which samples the corresponding symbols to generate a digital I and Q output for storage in a first-in first-out (FIFO) buffer 114.

In accordance with the invention, the second portion of the QPSK signal is passed through a frequency modulation (FM) demodulator 120 to generate a measure of the instantaneous frequency of the signal which is the derivative of the phase that contains the transmitted data. The FM demodulator 120 may include, e.g., an FM discriminator and/or other well-known FM demodulation circuitry. The instantaneous frequency output of the FM demodulator 120 is then applied to a peak detector 124. The peak detector generates a signature which is supplied to a digital signal processor (DSP) 126. The DSP 126 uses this signature to generate an appropriate sample timing signal which is supplied to a sample timing generator 128. The sample timing signal may, e.g., indicate that the sample timing is to be advanced or retarded based on the signature from the peak detector 124. The DSP 126 may include, e.g., a conventional zero crossing detector and appropriate logic circuitry, in order to determine the appropriate sample timing based on the signature supplied by the peak detector 124. The signature can be used, e.g., to determine the start or end of a given symbol in a stream of symbols.

In alternative embodiments, one or more of the zero-crossing detector, logic circuitry or other processing elements may be implemented separately from the DSP 126. Furthermore, numerous other arrangements of circuitry may be used to generate a measure of frequency of a phase-modulated signal. The term "measure of frequency" as used herein is intended to include any type of frequency information which can be derived from a phase-modulated signal and utilized to control sample timing. A measure of frequency may therefore be a measure of instantaneous frequency, or another type of frequency information suitable for use in sample timing control.

The sample timing generator 128 generates a sample clock which is applied to the A/D converter 112 and used in sampling the I and Q signal symbols. The timing of the sample clock is thus based on the signature supplied by the peak detector 124, and can be arranged so as to provide desired T/4 sampling within a given symbol. The digital I and Q output from FIFO 114 may be delivered to the DSP 126 for further processing, e.g., for generating a corresponding output digital data bitstream of a desired format.

Figure 5:
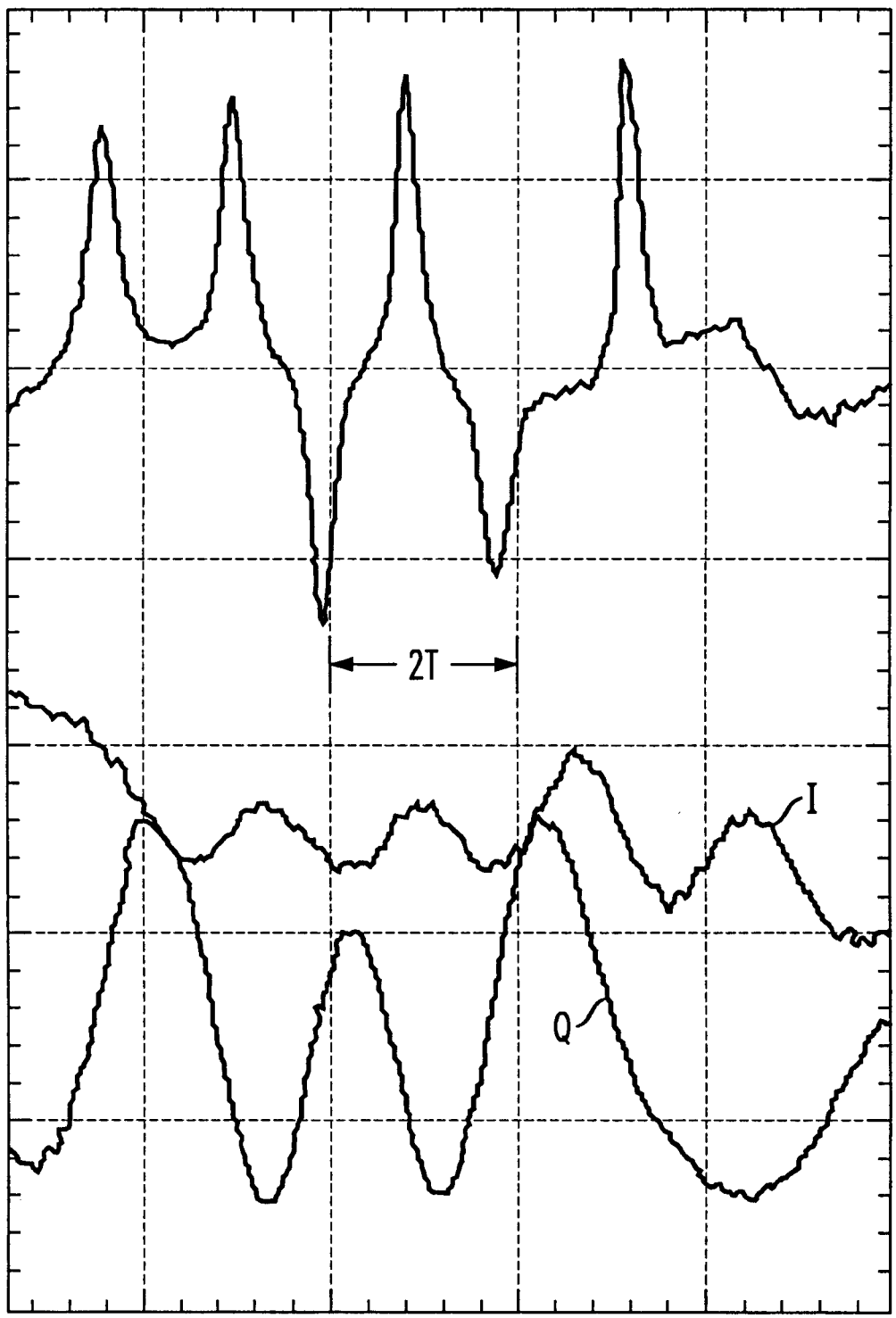
FIG. 5 shows an FM demodulator output which may be generated in the receiver of FIG. 4, along with corresponding demodulated I and Q output signals.

FIG. 5 shows an example of an FM demodulator output which may be generated in the receiver of FIG. 4, along with corresponding I and Q demodulated output signals. Each horizontal division in the plots of FIG. 5 corresponds to 2T, i.e., two times the symbol period T. The uppermost signal in FIG. 5 represents the signal output of an FM discriminator circuit in the FM demodulator 120 of FIG. 4, as generated from the second portion of a QPSK signal when the modulated data corresponds to a particular synchronization word, i.e., synchronization word 1 of FIG. 7. The I and Q signals shown in FIG. 5 are the corresponding I and Q outputs of the QPSK demodulator 110, generated from the first portion of the same QPSK signal.

Figure 6:
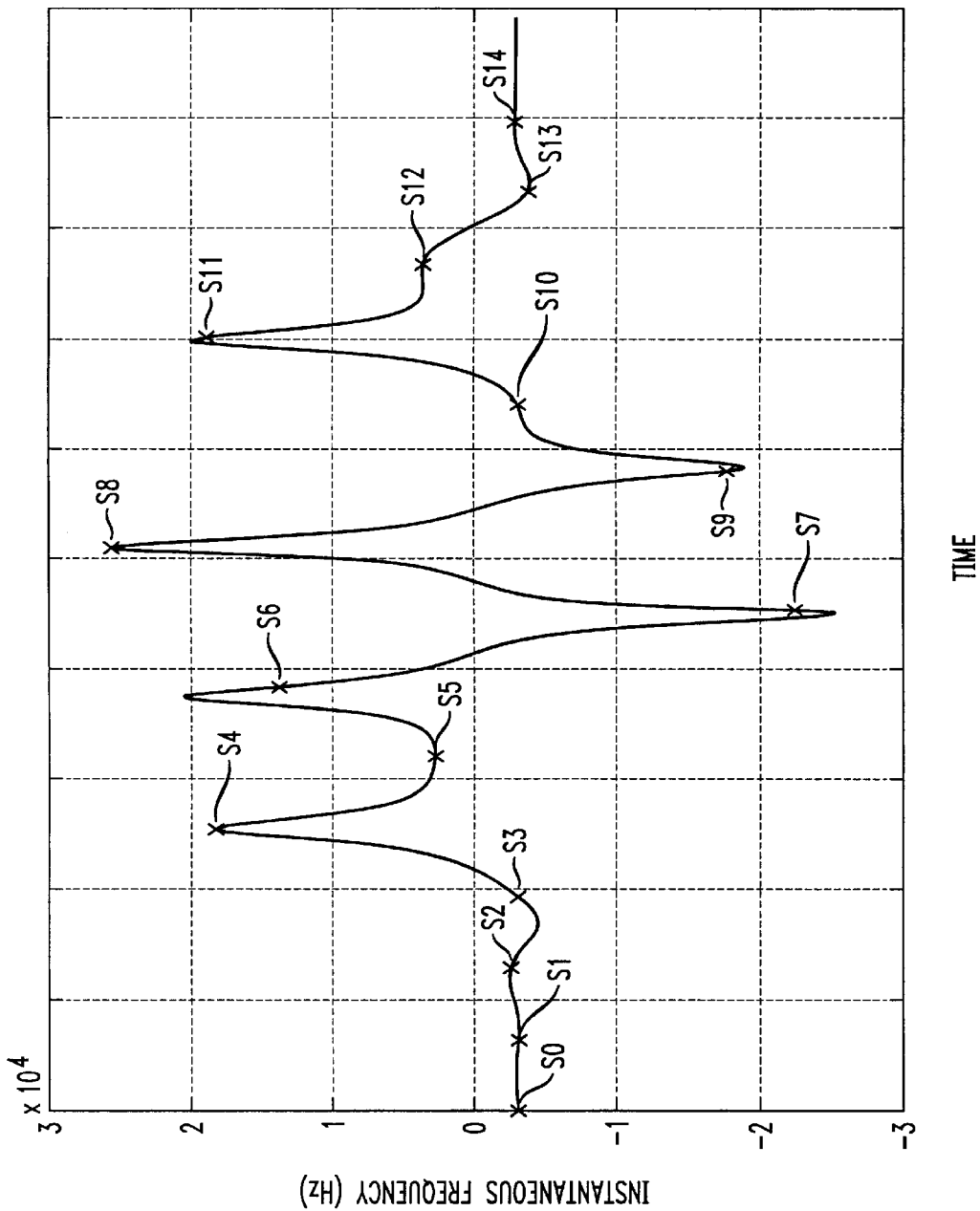
FIG. 6 shows a simulated version of the FM demodulator output of FIG. 5.

FIG. 6 shows a corresponding simulated version of the instantaneous frequency changes associated with the symbol-to-symbol phase changes in the synchronization word 1 of FIG. 7. It can be seen that the signal output of the FM discriminator as shown in FIG. 5 corresponds closely to the simulated instantaneous frequency changes as shown in FIG. 6. The table of FIG. 7 shows the phase changes over a set of 14 symbols, S0 through S13, for each of six possible synchronization words, i.e., sync words 1 through 6, in an exemplary IS-136 TDMA system such as that described in the TIA/EIA 627 standard, IS-136.2-A.

Each of the synchronization words shown in the table of FIG. 7 provides a unique signature that can be used in the receiver 100 to generate appropriate sample timing information. The synchronization word signature at the output of the peak detector can thus be used to capture substantially the exact moment of the start of a phase change in a given symbol. As noted above, the DSP 126 may include, e.g., a conventional zero crossing detector and appropriate logic circuitry to make such a determination. Note that the phase changes given for synchronization word 1 in FIG. 7 lead to the instantaneous frequency changes shown in FIGS. 5 and 6. For example, the first four symbols S0, S1, S2 and S3 have phase shifts of -π/4, -π/4, -π/4 and 3π/4, respectively, as shown in FIG. 7. As a result, the symbols S0, S1 and S2 lead to no significant change in instantaneous frequency, but symbol S3 leads to a substantial change in instantaneous frequency, as shown in FIG. 6. Detection of a signature corresponding to synchronization word 1 can thus be used to determine the start of symbol S3, and this information can be used to establish an appropriate T/4 sample timing for subsequent received symbols.

Figure 2:
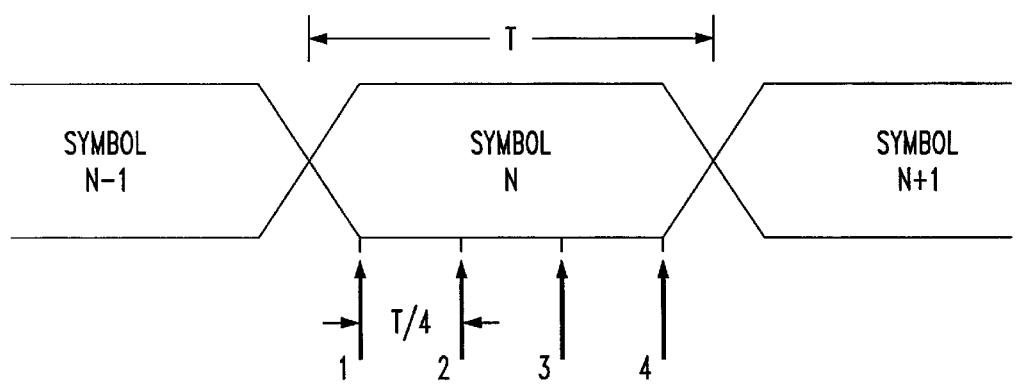

By using such synchronization words to generate sample timing, it is possible to ensure that the π/4 sampling will correspond to the desired timing, e.g., the best case T/4 sample timing as illustrated and described in conjunction with FIG. 2. This will significantly improve the BER performance of the received data, without requiring any increase in the sample rate or the complexity and cost associated with the demodulation process.

Since the output of the FM demodulator 120 is the instantaneous frequency of the signal which is the derivative of the phase, there is no need for automatic gain control or automatic frequency correction. This means that the sample timing generation technique of the present invention is resistant to factors such as gain variations, fades, speed, distance, filter group delay and processing time associated with the transmitting source.

It should be emphasized that the exemplary demodulation techniques described herein are intended to illustrate the operation of the invention, and therefore should not be construed as limiting the invention to any particular embodiment or group of embodiments. For example, although well suited for implementation in a wireless TDMA system, the invention can be used in other applications. In addition, a system in accordance with the invention may include additional elements, such as, for example, multiple base stations and mobile units, mobile switching centers (MSCs) for connecting one or more of the base stations to a public switched telephone network (PSTN), and memory or other storage elements for storing, e.g., system programs and configuration data, user data and billing information. Furthermore, it will be apparent to those skilled in the art that the receiver shown herein for purposes of illustrating the invention may be implemented in many different ways, and may include a number of additional elements, e.g., additional down-converters, signal sources, filters, demodulators, detectors, signal processors, etc., configured in a conventional manner. More particularly, alternative embodiments of the invention may use different types of circuitry for generating a measure of frequency from a phase-modulated signal, and for generating appropriate sample timing based at least in part on the frequency measure. These and numerous other alternative embodiments within the scope of the following claims will therefore be apparent to those skilled in the art.

What is claimed is:

1. A method of demodulating a phase-modulated signal in a communication system, the method comprising the steps of:
    generating a measure of the frequency of the phase-modulated signal by applying the phase-modulated signal to a frequency modulation demodulator; and
    utilizing the measure of the frequency of the phase-modulated signal to control sample timing for sampling of demodulated symbols generated by phase demodulating the phase-modulated signal in a phase modulation demodulator.

2. The method of claim 1 wherein the measure of the frequency of the phase-modulated signal is a measure of the instantaneous frequency of the phase-modulated signal.

3. The method of claim 1 wherein the system is a wireless TDMA communication system.

4. The method of claim 1 wherein the phase-modulated signal is a quadrature phase-shift-keyed (QPSK) signal.

5. The method of claim 4 wherein the phase-modulated signal is a π/4 differential quadrature phase-shift-keyed (DQPSK) signal.

6. The method of claim 2 wherein the generating step includes separating the phase-modulated signal into a first portion and a second portion, phase demodulating the first portion to generate the demodulated symbols, and frequency demodulating the second portion to generate the measure of instantaneous frequency.

7. The method of claim 2 wherein the generating step includes frequency demodulating the phase-modulated signal to generate the measure of the instantaneous frequency.

8. The method of claim 7 wherein the generating step further includes processing a frequency demodulated version of the phase-modulated signal to generate the measure of the instantaneous frequency.

9. The method of claim 2 wherein the measure of the instantaneous frequency of the phase-modulated signal is a signal having a signature associated with a particular synchronization word utilized in the system.

10. The method of claim 2 wherein the utilizing step includes generating a sample clock for sampling the demodulated symbols, based at least in part on the measure of the instantaneous frequency of the phase-modulated signal.

11. The method of claim 2 wherein the utilizing step includes adjusting a sample clock for sampling the demodulated symbols, based at least in part on the measure of the instantaneous frequency of the phase-modulated signal.

12. An apparatus for demodulating a phase-modulated signal in a communication system, the apparatus comprising:
    a frequency modulation demodulator for generating a measure of the frequency of the phase-modulated signal;
    a phase modulation demodulator for phase demodulating the phase-modulated signal; and
    a sample timing generator having an input coupled to an output of the frequency modulation demodulator, and operative to control sample timing for sampling of demodulated symbols generated by phase demodulating the phase-modulated signal in the phase modulation demodulator, wherein the sample timing is based at least in part on the measure of the frequency of the phase-modulated signal.

13. The apparatus of claim 12 wherein the measure of the frequency of the phase-modulated signal is a measure of the instantaneous frequency of the phase-modulated signal.

14. The apparatus of claim 12 wherein the system is a wireless TDMA communication system.

15. The apparatus of claim 12 wherein the phase-modulated signal is a quadrature phase-shift-keyed (QPSK) signal.

16. The apparatus of claim 15 wherein the phase-modulated signal is a π/4 differential quadrature phase-shift-keyed (DQPSK) signal.

17. The apparatus of claim 13 wherein the apparatus further includes:
    a signal splitter for separating the phase-modulated signal into a first portion and a second portion;
    the phase modulation demodulator demodulating the first portion to generate the demodulated symbols, wherein the second portion is demodulated in the frequency modulation demodulator to generate the measure of instantaneous frequency.

18. The apparatus of claim 13 wherein the frequency modulation demodulator frequency demodulates the phase-modulated signal to generate the measure of the instantaneous frequency.

19. The apparatus of claim 18 further including processing circuitry for processing a frequency demodulated version of the phase-modulated signal to generate the measure of the instantaneous frequency.

20. The apparatus of claim 13 wherein the measure of the instantaneous frequency of the phase-modulated signal is a signal having a signature associated with a particular synchronization word utilized in the system.

21. The apparatus of claim 13 wherein the sample timing generator is operative to generate a sample clock for sampling the demodulated symbols, based at least in part on the measure of the instantaneous frequency of the phase-modulated signal.

22. The apparatus of claim 13 wherein the sample timing generator is operative to adjust a sample clock for sampling the demodulated symbols, based at least in part on the measure of the instantaneous frequency of the phase-modulated signal.

* * * * *